(12) United States Patent
Tateno (10) Patent No.: US 9,921,435 B2
(45) Date of Patent: Mar. 20, 2018

(54) ELECTRO-OPTICAL DEVICE AND ELECTRONIC APPARATUS

(71) Applicant: Seiko Epson Corporation, Tokyo (JP)

(72) Inventor: Yoshitake Tateno, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/195,997

(22) Filed: Jun. 28, 2016

(65) Prior Publication Data

US 2017/0090254 A1    Mar. 30, 2017

(30) Foreign Application Priority Data

Sep. 24, 2015  (JP) ................. 2015-186470

(51) Int. Cl.
  *G02F 1/1343*   (2006.01)
  *G02F 1/1335*   (2006.01)

(52) U.S. Cl.
  CPC .... *G02F 1/134309* (2013.01); *G02F 1/13439* (2013.01); *G02F 1/133512* (2013.01); *G02F 1/133526* (2013.01); *G02F 2201/121* (2013.01); *G02F 2201/123* (2013.01); *G02F 2203/01* (2013.01); *G02F 2203/04* (2013.01); *G02F 2203/12* (2013.01)

(58) Field of Classification Search
  CPC ......... G02F 1/134309; G02F 1/133526; G02F 2201/123; G02F 2201/121
  See application file for complete search history.

(56) References Cited

U.S. PATENT DOCUMENTS

| | | | |
|---|---|---|---|
| 6,204,905 B1* | 3/2001 | Koma ............... | G02F 1/134309 349/123 |
| 2003/0164910 A1* | 9/2003 | Yamazaki ......... | G02F 1/133555 349/113 |
| 2008/0129902 A1* | 6/2008 | Qi .................... | G02F 1/133345 349/33 |
| 2014/0098326 A1* | 4/2014 | Qian .................... | G02F 1/1334 349/86 |
| 2015/0042926 A1* | 2/2015 | Akasaka ........... | G02F 1/133526 349/95 |

FOREIGN PATENT DOCUMENTS

JP    2001-021879 A    1/2001

* cited by examiner

*Primary Examiner* — Donald Raleigh
(74) *Attorney, Agent, or Firm* — ALG Intellectual Property, LLC (57) ABSTRACT

In an electro-optical device, a pixel electrode is provided in a first light-transmitting substrate, and a lens, which overlaps the pixel electrode in a plan view, and a common electrode are provided in a second light-transmitting substrate. The pixel electrode includes an ITO film which includes a first electrically conducting layer stacked a first light-transmitting dielectric layer, and the common electrode includes a second electrically conducting layer which includes an ITO film which is stacked a second light-transmitting dielectric layer. Therefore, it is possible to suppress wavelength dispersion in a case in which incident light is modulated and is emitted. The first dielectric layer includes a silicon oxide film and the second dielectric layer includes an aluminum oxide film.

10 Claims, 8 Drawing Sheets

ELECTRO-OPTICAL DEVICE AND ELECTRONIC APPARATUS

BACKGROUND

1. Technical Field

The present invention relates to an electro-optical device, in which a dielectric layer is stacked on an electrically conducting layer using electrodes that drive an electro-optical layer, and an electronic apparatus.

2. Related Art

In an electro-optical device (liquid crystal apparatus), which is used as a light valve or the like of a transmission-type liquid crystal apparatus, an electro-optical layer (liquid crystal layer) is arranged between a first substrate on which pixel electrodes are formed and a second substrate on which a common electrode is formed, and an image is displayed by modulating light, which is incident on one side of the first substrate and the second substrate, in a liquid crystal layer. At this time, light is transmitted through the common electrode. Therefore, in a case in which a decrease in transmittance is generated due to wavelength dispersion in the common electrode, the quality of a displayed image decreases. In contrast, a structure (refer to JP-A-2001-21879) has been proposed in which the light-transmitting dielectric layer is stacked on the electrically conducting layer that uses the light-transmitting common electrode in a reflection-type electro-optical device.

However, in the transmission-type electro-optical device, in a case in which the image is displayed by modulating light, which is incident from one side of the first substrate and the second substrate, in the liquid crystal layer, light is transmitted through the common electrode and the pixel electrodes. Therefore, even though the configuration disclosed in JP-A-2001-21879 is used for the purpose of suppressing the wavelength dispersion, the wavelength dispersion is generated in the pixel electrodes, and thus it is difficult to sufficiently suppress a decrease in the quality of the image due to the wavelength dispersion.

SUMMARY

An advantage of some aspects of the invention is that an electro-optical device and an electronic apparatus, which are capable of effectively suppressing wavelength dispersion in a case in which incident light is modulated and emitted, are provided.

According to an aspect of the invention, there is provided an electro-optical device including: a first light-transmitting substrate; a second light-transmitting substrate that faces the first substrate; an electro-optical layer that is provided between the first substrate and the second substrate; a light-transmitting pixel electrode that is provided on a surface of the first substrate on a side opposite to the second substrate; and a light-transmitting common electrode that is provided on a surface of the second substrate on a side opposite to the first substrate, in which the pixel electrode includes a first dielectric layer and a first electrically conducting layer, an in which the common electrode includes a second dielectric layer and a second electrically conducting layer.

According to the aspect of the invention, the first dielectric layer is stacked the first electrically conducting layer which is used for the pixel electrode, and the second dielectric layer is stacked the second electrically conducting layer which is used for the common electrode. Therefore, if the refractive indexes and thicknesses of the first electrically conducting layer and the first dielectric layer are adjusted and the refractive indexes and the thicknesses of the second electrically conducting layer and the second dielectric layer are adjusted, it is possible to effectively suppress wavelength dispersion in both the common electrode and the pixel electrode in a case in which light, which is incident from one of the first substrate and the second substrate, is modulated in the electro-optical layer and is emitted from the other substrate. Accordingly, it is possible to suppress a decrease in the quality of an image due to the wavelength dispersion.

According to the aspect of the invention, it is preferable that the first dielectric layer includes a material which is different from that of the second dielectric layer. In the electro-optical device, even in a situation in which an upper limit temperature, acquired in a case in which the first dielectric layer is formed on the first substrate, is different from an upper limit temperature, acquired in a case in which the second dielectric layer is formed on the second substrate, it is possible to form the first dielectric layer and the second dielectric layer using a material and a film formation temperature according to the situation. Accordingly, it is possible to appropriately laminate the dielectric layer on the electrically conducting layer in both the pixel electrode and the common electrode.

According to the aspect of the invention, it is possible to use a configuration in which the first dielectric layer includes a silicon oxide film and the second dielectric layer includes an aluminum oxide film.

It is effective to apply the aspect of the invention in a case in which a lens layer is provided between the second substrate and the common electrode, the second substrate includes a lens surface which includes a concave surface or a convex surface in a location overlapping the pixel electrode on a surface of a side of the first substrate in a plan view, and the lens layer covers the lens surface, and it is effective to apply the lens layer in a case in which a surface on a side opposite to the second substrate is flat. In a case in which the lens is provided in the second substrate, the lens layer is formed over a wide area of the substrate regardless if the thickness changes greatly depending on the location. Therefore, if the temperature is high in a case in which the second dielectric layer is formed, cracks or the like are generated on the lens layer. Accordingly, although there is a case in which the upper limit temperature, acquired in a case in which the second dielectric layer is formed on the second substrate, is lower than the upper limit temperature, acquired in a case in which the first dielectric layer is formed on the first substrate, it is possible to form the second dielectric layer using the material according to the situation. Therefore, it is possible to appropriately laminate the dielectric layer on the electrically conducting layer in both the pixel electrode and the common electrode.

According to the aspect of the invention, it is possible to use a configuration in which the pixel electrode includes a third electrically conducting layer, the common electrode includes a fourth electrically conducting layer, the first dielectric layer is provided between the first electrically conducting layer and the third electrically conducting layer, and the second dielectric layer is provided between the second electrically conducting layer and the fourth electrically conducting layer.

According to another aspect of the invention, there is provided an electro-optical device including: a first light-transmitting substrate; a second light-transmitting substrate that faces the first substrate; an electro-optical layer that is provided between the first substrate and the second substrate; a light-transmitting pixel electrode that is provide on a surface of the first substrate on a side of the second substrate; and a light-transmitting common electrode that is provided on a surface of the second substrate on the side of the first substrate, in which the pixel electrode is an electrode in which a plurality of dielectric layers and a plurality of conductive layers are alternately laminated, and in which the common electrode is an electrode in which the plurality of dielectric layers and the plurality of conductive layers are alternately laminated. According to the aspect of the invention, the plurality of electrically conducting layers and the plurality of dielectric layers are alternately stacked the pixel electrode, and the plurality of electrically conducting layers and the plurality of dielectric layers are alternately stacked the common electrode. Therefore, if the refractive indexes and the thicknesses of the electrically conducting layers and the dielectric layers are adjusted, it is possible to effectively suppress the wavelength dispersion in both the common electrode and the pixel electrode in a case in which light, which is incident from one of the first substrate and the second substrate, is modulated in the electro-optical layer and is emitted from the other substrate. Accordingly, it is possible to suppress a decrease in the quality of an image due to the wavelength dispersion.

It is possible to use the electro-optical device according to the aspect of the invention for electronic apparatuses such as a mobile phone, a mobile computer, a camera finder, and a transmission-type liquid crystal apparatus. From among the electronic apparatuses, the transmission-type liquid crystal apparatus includes a light source section that supplies light to the electro-optical device, and a projection optical system that projects light which is optically modulated by the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the accompanying drawings. In the drawings which are referred to in the description below, each layer and each member are shown at sizes which can be recognized in the drawing, and thus the scales thereof are different for each layer and each member. In addition, in the description below, in a case in which a layer which is formed on a first substrate 10 (element substrate) is described, an upper layer side or a surface side means a side (side on which a second substrate 20 is located) opposite to a side on which a light-transmitting substrate 19 is located, and a lower layer side means a side on which the light-transmitting substrate 19 is located. In addition, in a case in which a layer which is formed on the second substrate 20 (counter substrate) is described, the upper layer side or the surface side means a side (side on which the first substrate 10 is located) opposite to a side on which a light-transmitting substrate 29 is located, and the lower layer side means a side on which the light-transmitting substrate 29 is located.

Configuration of Electro-Optical Device

Figure 1:
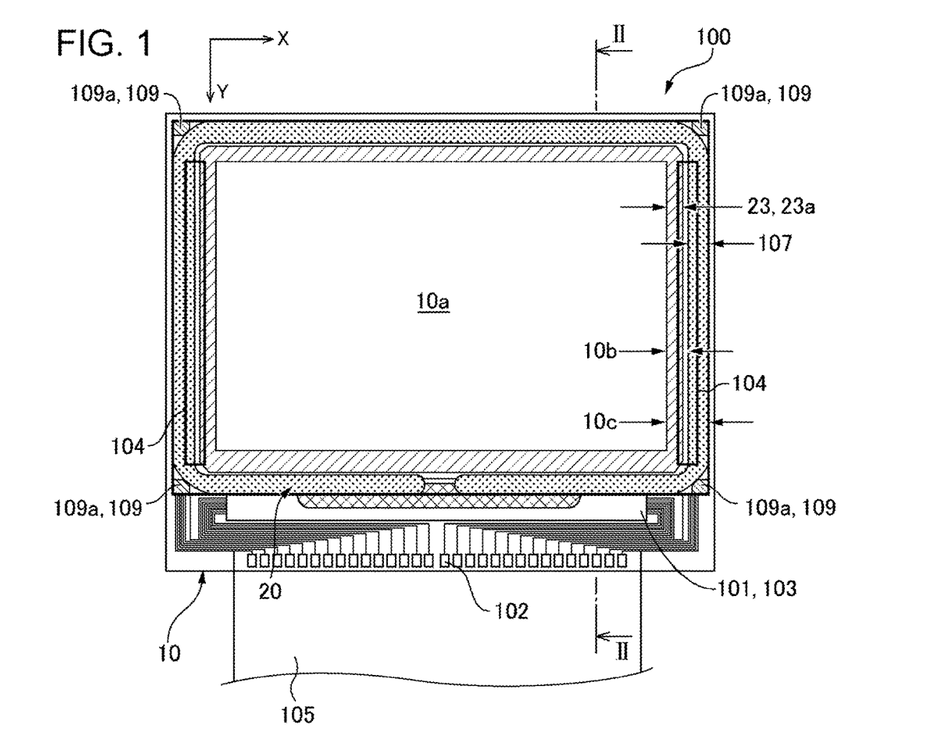
FIG. 1 is a plan view illustrating an embodiment of an electro-optical device to which the invention is applied.
Figure 2:
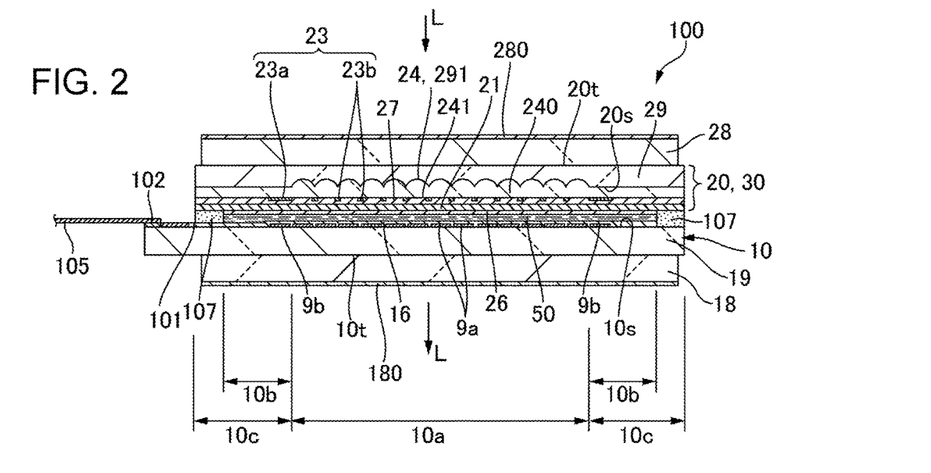
FIG. 2 is a sectional view illustrating the embodiment of the electro-optical device to which the invention is applied.

FIG. 1 is a plan view illustrating an embodiment of an electro-optical device 100 to which the invention is applied. FIG. 2 is a sectional view illustrating the embodiment of the electro-optical device 100 to which the invention is applied.

As illustrated in FIGS. 1 and 2, in the electro-optical device 100, a first light-transmitting substrate (element substrate) 10 and the second light-transmitting substrate (counter substrate) 20 are bonded by a seal material 107 disposed in a predetermined gap, and the first substrate 10 faces the second substrate 20. The seal material 107 is provided in a frame shape along the outer edge of the second substrate 20, and a liquid crystal layer, which functions as an electro-optical layer 50, is arranged in a region which is surrounded by the seal material 107 between the first substrate 10 and the second substrate 20. Accordingly, the electro-optical device 100 is formed as a liquid crystal apparatus. The seal material 107 is a photosetting adhesive or a photosetting and thermosetting adhesive, and contains a gap material, such as glass fibers or glass beads, in order to set the distance between both of the substrates to a predetermined value.

Both the first substrate 10 and the second substrate 20 have a square shape, and an image display region 10a is provided at approximately the center of the electro-optical device 100 as a square-shaped region. Accordingly, the seal material 107 is also provided in an approximately square shape, and a rectangular-shaped peripheral region 10b is provided between the inner periphery of the seal material 107 and the outer periphery of the display region 10a.

On a side of one surface 10s of the first substrate 10, a data line drive circuit 101 and a plurality of terminals 102 are formed along one side of the first substrate 10 on the side of the second substrate 20, and a scan line drive circuit 104 is formed along other sides which are adjacent to the one side. A flexible wiring substrate 105 is connected to the terminals 102, and various potentials and various signals are input to the first substrate 10 through the flexible wiring substrate 105.

On the side of one surface 10s of the first substrate 10, a plurality of light-transmitting pixel electrodes 9a, which include Indium Tin Oxide (ITO) films or the like, and pixel switching elements (not shown in the drawing), which are electrically connected to the plurality of respective pixel electrodes 9a, are formed in a matrix shape in the display region 10a. A first oriented film 16 is formed on the pixel electrodes 9a on the side of the second substrate 20, and the pixel electrodes 9a are covered by the first oriented film 16.

A light-transmitting common electrode 21, which includes an ITO film, is formed on the side 20s of a one surface of the second substrate 20 which faces the first substrate 10, and a second oriented film 26 is formed on the common electrode 21 on the side of the first substrate 10. The common electrode 21 is formed on approximately the entire surface of the second substrate 20, and is covered by the second oriented film 26. A light-shading light-shield layer 23, which is formed of metal or a metal compound, is formed on the common electrode 21 on a side opposite to the first substrate 10. The light-shield layer 23 is formed, for example, as a divider 23a in a frame shape, which extends along the outer periphery of the display region 10a. In addition, the light-shield layer 23 is also formed as a light-shield layer 23b in a region which overlaps with a region interposed by adjacent pixel electrodes 9a in plan view. In the embodiment, dummy pixel electrodes 9b, which are simultaneously formed with the pixel electrodes 9a, are formed in a region which overlaps the divider 23a in the peripheral region 10b of the first substrate 10 in plan view.

The first oriented film 16 and the second oriented film 26 are inorganic oriented films (vertically oriented films) which include a diagonally vapor-deposited film, such as silicon oxide (SiOx (x≤2)), titanium oxide (TiO$_2$), magnesium oxide (MgO), aluminum oxide (Al$_2$O$_3$), and cause liquid crystal molecules having negative dielectric anisotropy, which is used for the electro-optical layer 50, to be inclined alignment. Therefore, the liquid crystal molecules form a predetermined angle for the first substrate 10 and the second substrate 20. In this manner, the electro-optical device 100 is formed as a liquid crystal apparatus in a Vertical Alignment (VA) mode.

In the first substrate 10, inter-substrate conduction electrodes 109 are formed in regions, which overlap the corner parts of the second substrate 20 on the outer side of the seal material 107, in order to take electrical conduction between the first substrate 10 and the second substrate 20. In the inter-substrate conduction electrodes 109, an inter-substrate conduction material 109a, which include conductive particles, is arranged. The common electrode 21 of the second substrate 20 is electrically connected to the side of the first substrate 10 through the inter-substrate conduction material 109a and the inter-substrate conduction electrodes 109. Therefore, a common potential is applied to the common electrode 21 from the side of the first substrate 10.

In the electro-optical device 100 of the embodiment, the pixel electrode 9a and the common electrode 21 are formed by a light-transmitting electrically conducting layer such as the ITO film, and the electro-optical device 100 is formed as a transmission-type liquid crystal apparatus. In the electro-optical device 100, an image is displayed in such a way that light, which is incident on one of the first substrate 10 and the second substrate 20, is modulated during a time in which light passes through the other-side substrate and is emitted. In the embodiment, an image is displayed in such a way that light, as illustrated using an arrow L, which is incident from the second substrate 20, is modulated by the electro-optical layer 50 for each pixel during a time in which light passes through the first substrate 10 and is emitted.

Here, in a case in which the electro-optical device 100 is used as a light valve or the like of the transmission-type liquid crystal apparatus which will be described later, a light-transmitting dust-proof glass 18 is pasted to the other side surface 10t of the first substrate 10, which is opposite to the second substrate 20, as illustrated in FIG. 2. An anti-reflection layer 180 is formed on the surface of the dust-proof glass 18 which is opposite to the first substrate 10. In addition, a light-transmitting dust-proof glass 28 is pasted to the other side surface 20t of the second substrate 20 which is opposite to the first substrate 10. An anti-reflection layer 280 is formed on the surface of the dust-proof glass 28 which is opposite to the second substrate 20.

Detailed Configuration of Pixel

Figure 3:
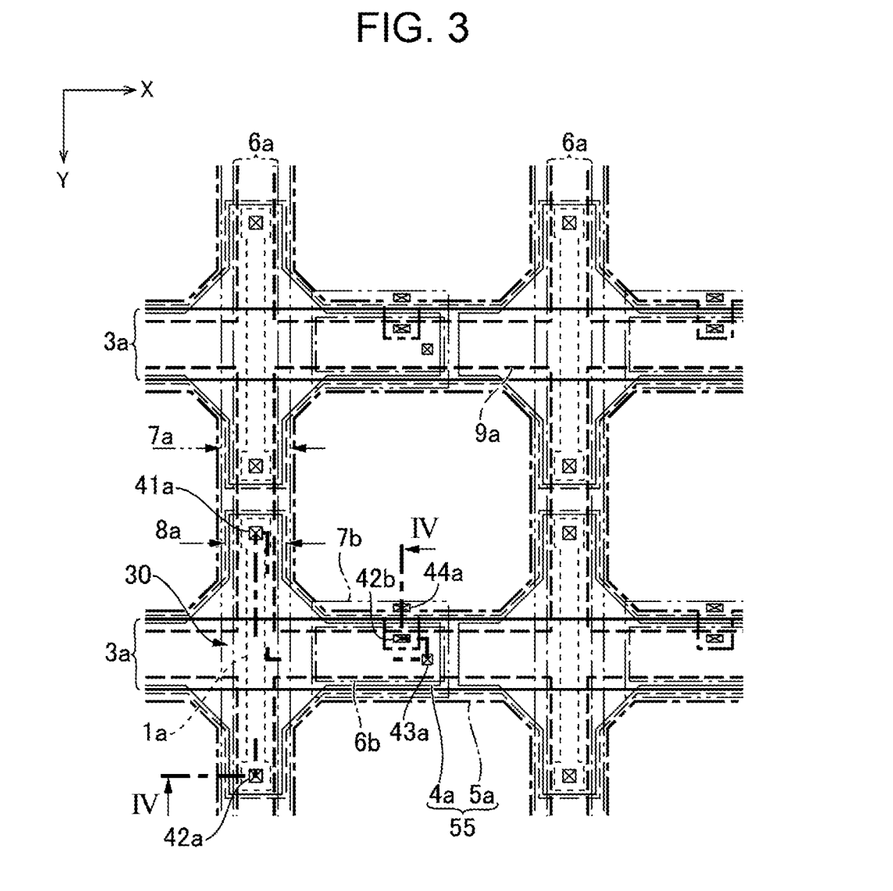
FIG. 3 is a plan view illustrating an embodiment of a plurality of pixels which are adjacent to each other in the electro-optical device to which the invention is applied.
Figure 4:
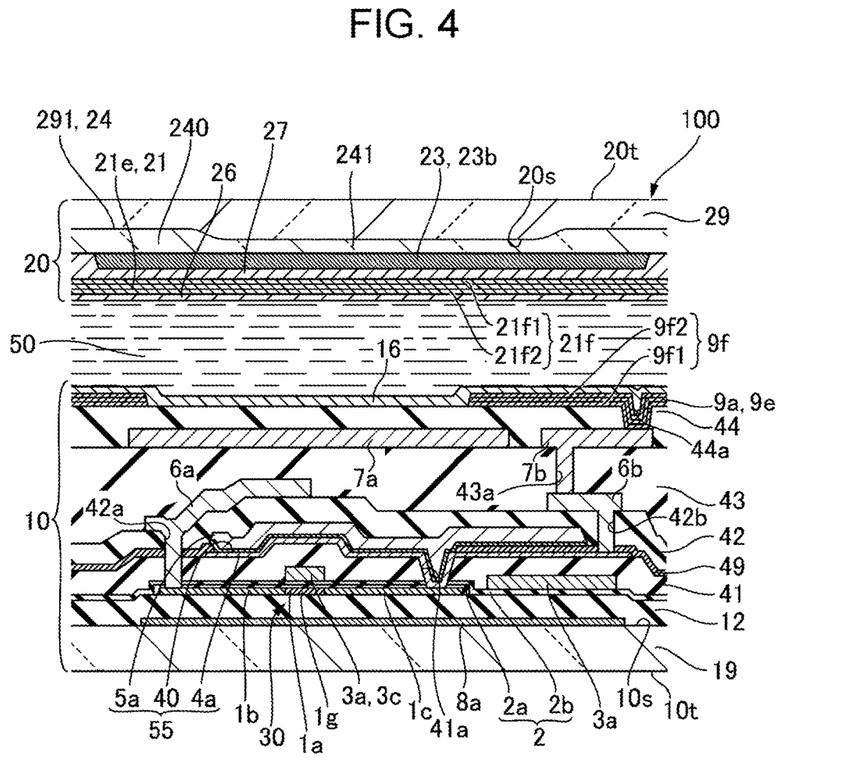
FIG. 4 is a sectional view illustrating the pixel illustrated in FIG. 3 taken along line IV-IV.

FIG. 3 is a plan view illustrating an embodiment of a plurality of pixels which are adjacent to each other in the electro-optical device 100 to which the invention is applied. FIG. 4 is a sectional view illustrating a pixel illustrated in FIG. 3 taken along the line IV-IV. In FIG. 3, the respective layers are indicated by lines below. In addition, in FIG. 3, with regard to layers which have terminals overlapping each other in plan view, the positions of the terminals are shifted such that the shapes or the like of the layers are easily understood.

Thin long broken line denotes a lower layer-side light-shield layer 8a.
Thin and short dotted line denotes a semiconductor layer 1a.
Thick solid line denotes a scan line 3a.
Thin solid line denotes a drain electrode 4a.
Thin one-dot chain line denotes a data line 6a and a relay electrode 6b.
Thick one-dot chain line denotes a capacitance line 5a.
Thin two-dot chain line denotes an upper layer-side light-shield layer 7a and a relay electrode 7b.
Thick broken line denotes the pixel electrode 9a.

As illustrated in FIG. 3, the pixel electrodes 9a are formed in the respective plurality of pixels on the side of one surface 10s of the first substrate 10, and the data lines 6a and the scan lines 3a are formed along inter-pixel regions interposed by the adjacent pixel electrodes 9a. The inter-pixel regions extend horizontally and vertically, the scan lines 3a linearly extend along a first inter-pixel region, which extends in the X direction, of the inter-pixel regions, and the data lines 6a linearly extend along a second inter-pixel region which extends in the Y direction. In addition, pixel switching elements 30 are formed so as to correspond to the intersections of the data lines 6a and the scan lines 3a. In the embodiment, the pixel switching elements 30 are formed using intersection regions between the data lines 6a and the scan lines 3a and the vicinity thereof. The capacitance lines 5a are formed in the first substrate 10, and a common potential Vcom is applied to the capacitance lines 5a. The capacitance lines 5a are formed in a lattice shape in such a way as to overlap the scan lines 3a and the data lines 6a. The upper layer-side light-shield layer 7a is formed on the upper layer side of the pixel switching elements 30, and the upper layer-side light-shield layer 7a extends so as to overlap the data lines 6a and the scan lines 3a. The lower layer-side light-shield layer 8a is formed on the lower layer side of the pixel switching elements 30, and the lower layer-side light-shield layer 8a extends so as to overlap the scan lines 3a and the data lines 6a.

As illustrated in FIG. 4, the substrate main body of the first substrate 10 is formed of a light-transmitting substrate 19, such as a quartz substrate or a glass substrate, and the pixel electrode 9a, the pixel switching element 30, the first oriented film 16, and the like are formed on a surface (one surface 10s of the first substrate 10) of the light-transmitting substrate 19 on the side of the electro-optical layer 50, as will be described later. In addition, the substrate main body of the second substrate 20 is formed of a light-transmitting substrate 29, such as the quartz substrate or the glass substrate, and the light-shield layer 23, the common electrode 21, the second oriented film 26, and the like are formed on the surface (one surface 20s of the second substrate 20) of the light-transmitting substrate 29 on the side of the electro-optical layer 50, as will be described below.

In the first substrate 10, the lower layer-side light-shield layer 8a, which includes a conductive film such as a conductive polysilicon film, a metal silicide film, a metal film or a metal compound film, is formed on the side of one surface 10s of the light-transmitting substrate 19. In a case in which light that passes through the electro-optical device 100 is reflected in another member, the lower layer-side light-shield layer 8a prevents reflected light from being incident on the semiconductor layer 1a and a malfunction attributable to photoelectric current from occurring in the pixel switching element 30. There is a case in which the lower layer-side light-shield layer 8a is formed as the scan lines. In this case, the lower layer-side light-shield layer 8a is formed to enable electrical conduction between a gate electrode 3b, which will be described later, and the lower layer-side light-shield layer 8a.

A light-transmitting insulation film 12, which includes a silicon oxide film, is formed on the upper layer side of the lower layer-side light-shield layer 8a in the first substrate 10, and the pixel switching element 30, which includes the semiconductor layer 1a, is formed on the upper layer side of the insulation film 12. The pixel switching element 30 includes the semiconductor layer 1a, in which a long-side direction faces the extension direction of the data line 6a, and the gate electrode 3b, which extends in a direction orthogonal to the longitudinal direction of the semiconductor layer 1a and overlaps the central part of the longitudinal direction of the semiconductor layer 1a. The gate electrode 3b includes a part of the scan line 3a. The pixel switching element 30 includes a light-transmitting gate insulation layer 2 between the semiconductor layer 1a and the gate electrode 3b. The semiconductor layer 1a includes a channel region 1g, which faces the gate electrode 3b through the gate insulation layer 2, and includes a source region 1b and a drain region 1c on both sides of the channel region 1g. In the embodiment, the pixel switching element 30 has an LDD structure. Accordingly, the source region 1b and the drain region 1c respectively include low concentration regions on both sides of the channel region 1g, and include high-concentration regions in regions which are adjacent to the channel region 1g on the opposite side to the low concentration regions.

The semiconductor layer 1a is formed of a polysilicon film (polycrystalline silicon film) or the like. The gate insulation layer 2 includes a two-stacked structure which includes a first gate insulation layer 2a that is formed of a silicon oxide film acquired by performing thermal oxidation on the semiconductor layer 1a, and a second gate insulation layer 2b that is formed of a silicon oxide film formed using a decompression CVD method or the like. The gate electrode 3b and the scan line 3a include a conductive film such as a conductive polysilicon film, a metal silicide film, a metal film or a metal compound film.

A light-transmitting inter-layer insulation film 41, which includes the silicon oxide film, is formed on the upper layer side of the gate electrode 3b, and the drain electrode 4a is formed on the upper layer of the inter-layer insulation film 41. The drain electrode 4a includes a conductive film such as a conductive polysilicon film, a metal silicide film, a metal film or a metal compound film. The drain electrode 4a is formed such that a part of the drain electrode 4a overlaps the drain region 1c of the semiconductor layer 1a, and is electrically conducted to the drain region 1c through a contact hole 41a which passes through the inter-layer insulation film 41 and the gate insulation layer 2.

A light-transmitting etching stopper layer 49 and a light-transmitting dielectric layer 40, which include a silicon oxide film or the like, are formed on the upper layer side of the drain electrode 4a, and the capacitance line 5a is formed on the upper layer side of the dielectric layer 40. It is possible to use a silicon compound, such as a silicon oxide film or a silicon nitride film, as the dielectric layer 40. In addition, it is possible to use a dielectric layer, which has a high dielectric constant, such as an aluminum oxide film, a titanium oxide film, a tantalum oxide film, a niobium oxide film, a hafnium oxide film, a lanthanum oxide film, or a zirconium oxide film. The capacitance line 5a includes a conductive film, such as a conductive polysilicon film, a metal silicide film, a metal film, or a metal compound film. The capacitance line 5a overlaps the drain electrode 4a via the dielectric layer 40, and forms a maintenance capacitance 55.

A light-transmitting inter-layer insulation film 42, which includes a silicon oxide film or the like, is formed on the upper layer side of the capacitance line 5a, and the data line 6a and the relay electrode 6b are formed by the same conductive film on the upper layer side of the inter-layer insulation film 42. The data line 6a and the relay electrode 6b include a conductive film such as a conductive polysilicon film, a metal silicide film, a metal film or a metal compound film. The data line 6a is electrically connected to the source region 1b through the contact hole 42a which passes through the inter-layer insulation film 42, the etching stopper layer 49, the inter-layer insulation film 41 and the gate insulation layer 2. The relay electrode 6b is electrically connected to the drain electrode 4a through the contact hole 42b which passes through the inter-layer insulation film 42 and the etching stopper layer 49.

A light-transmitting inter-layer insulation film 43, which includes the silicon oxide film, is formed on the upper layer side of the data line 6a and the relay electrode 6b, and the upper layer-side light-shield layer 7a and the relay electrode 7b are formed by the same conductive film on the upper layer side of the inter-layer insulation film 43. The surface of the inter-layer insulation film 43 is flattened. The upper layer-side light-shield layer 7a and the relay electrode 7b include a conductive film such as a conductive polysilicon film, a metal silicide film, a metal film or a metal compound film. The relay electrode 7b is electrically connected to the relay electrode 6b through a contact hole 43a which passes through the inter-layer insulation film 43. The upper layer-side light-shield layer 7a extends so as to overlap the data line 6a, and functions as a light-shield layer. Meanwhile, the upper layer-side light-shield layer 7a may be electrically connected to the capacitance line 5a and to be used as a shield layer.

A light-transmitting inter-layer insulation film 44, which includes the silicon oxide film or the like, is formed on the upper layer side of the upper layer-side light-shield layer 7a and the relay electrode 7b, and the pixel electrode 9a, which includes the ITO film, is formed on the upper layer side of the inter-layer insulation film 44. The contact hole 44a, which reaches the relay electrode 7b, is formed in the inter-layer insulation film 44, and the pixel electrode 9a is electrically connected to the relay electrode 7b via the contact hole 44a. As a result, the pixel electrode 9a is electrically connected to the drain region 1c via the relay electrode 7b, the relay electrode 6b, and the drain electrode 4a. The first light-transmitting oriented film 16 is formed on the surface side of the pixel electrode 9a.

In the embodiment, as will be described later, the pixel electrode 9a includes a laminated film (Index Matched ITO (IMITO) film) on which a first dielectric layer 9f for adjusting a refractive index is stacked on a first electrically conducting layer 9e1 which includes an ITO film.

Configuration of Second Substrate 20

In the second substrate 20, the light-shield layer 23, the protective layer 27, which includes the silicon oxide film or the like, and the light-transmitting common electrode 21 are formed on the side of the one surface 20s of the light-transmitting substrate 29, and the second oriented film 26 is formed so as to cover the common electrode 21.

In the embodiment, as will be described later, the common electrode 21 includes the laminated film (IMITO film) on which the second dielectric layer 21f for adjusting a refractive index is stacked on a second electrically conducting layer 21e1 which includes an ITO film.

Configuration of Lens on Side of Second 20 Substrate 24

As described with reference to FIG. 4, the light-shield layer, which includes the data lines 6a or the like, and the pixel switching element 30 are formed on the side of one surface 10s of the first substrate 10, and light is not transmitted through the light-shield layer and the pixel switching element 30. Therefore, in the first substrate 10, from among the regions which overlap the pixel electrodes 9a in plan view, a region, which overlaps the light-shield layer and the pixel switching element 30 in plan view, and a region, which overlaps a region interposed between adjacent pixel electrodes 9a in plan view, become the light-shield region through which light is not transmitted. In contrast, from among the regions which overlap the pixel electrodes 9a in plan view, a region which does not overlap the light-shield layer and the pixel switching element 30 in plan view become an opening region (light transmission region) through which light is transmitted. Accordingly, only light, which is transmitted through the opening region, contributes to the display of an image, and light directed toward the light-shield region does not contribute to the display of the image.

Here, as illustrated in FIG. 2, in the second substrate 20, a plurality of lenses 24, which respectively overlap the plurality of pixel electrodes 9a in a plan view with one-to-one relationship, are formed, and the lenses 24 collimate light which is incident into the electro-optical layer 50. Therefore, since the inclination of the optical axis of light which is incident into the electro-optical layer 50 is small, it is possible to reduce the phase deviation in the electro-optical layer 50, and thus it is possible to suppress the decrease in transmittance and contrast. In particularly, in the embodiment, the electro-optical device 100 is formed as the liquid crystal apparatus in the VA mode, and thus the decrease in contrast or the like easily occurs according to the inclination of the optical axis of light which is incident into the electro-optical layer 50. However, according to the embodiment, it is difficult that the decrease of contrast occurs.

In a case in which the lenses 24 are formed, on one surface 20s of the light-transmitting substrate 29, a plurality of lens surfaces 291, which includes concave surfaces overlapping the plurality of respective pixel electrodes 9a in a plan view with one-to-one relationship, are formed. In addition, on one surface 20s of the light-transmitting substrate 29, the light-transmitting lens layer 240 is stacked the second substrate 20 and the common electrode 21, and the lens layer 240 has a flat surface 241 on a side opposite to the second substrate 20.

The light-transmitting substrate 29 and the lens layer 240 have different refractive indexes, and the lens surfaces 291 and the lens layer 240 form the lenses 24. In the embodiment, the refractive index of the lens layer 240 is larger than the refractive index of the light-transmitting substrate 29. For example, the light-transmitting substrate 29 includes a quartz substrate (silicon oxide) and the refractive index is 1.48. In contrast, the lens layer 240 includes a silicon oxinitride film (SiON) and the refractive index is 1.58 to 1.68. Therefore, the lenses 24 have power that causes light from the light source to be converged.

In a case in which the second substrate 20 is manufacturing, a quartz substrate includes a mother board, which is larger than the light-transmitting substrate 29, is formed on the lens surfaces 291, and then the lens layer 240 is formed on the whole surface of the mother board. Subsequently, the surface (surface 241) of the lens layer 240 is flattened by a CMP method or the like. Thereafter, the light-shield layer 23, the protective layer 27, the common electrode 21, the second oriented film 26, and the like are formed, and the mother board is cut, thereby acquiring the second substrate 20 having a single-unit size. First Configuration Example of Electro-optical Device 100

Figure 5:
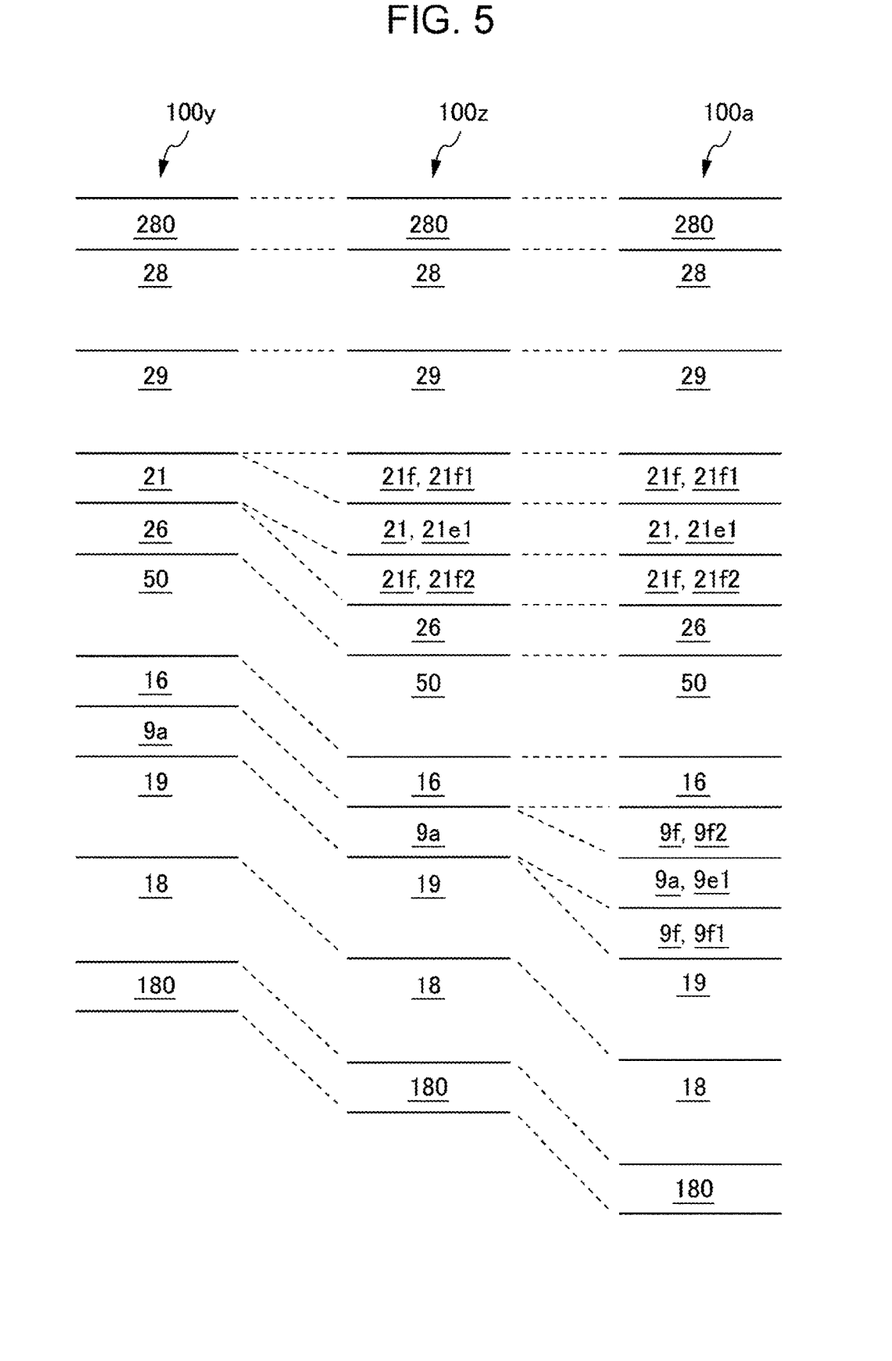
FIG. 5 is an explanatory view illustrating the configuration of a pixel electrode and a common electrode of the electro-optical device according to a first configuration example of the invention.
Figure 6:
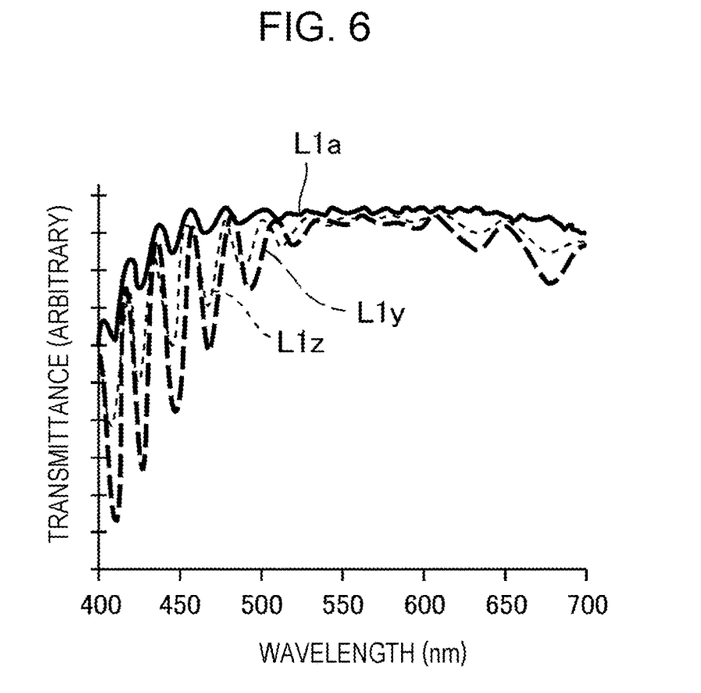
FIG. 6 is a graph illustrating a wavelength-transmittance relationship of the electro-optical device or the like according to the first configuration example of the invention.

FIG. 5 is an explanatory view illustrating the configuration of the pixel electrode 9a and the common electrode 21 of the electro-optical device 100a according to a first configuration example of the invention. Meanwhile, FIG. 5 also illustrates the configuration of the pixel electrode 9a and the common electrode 21 of the electro-optical device 100y according to a first reference example, and the configuration of the pixel electrode 9a and the common electrode 21 of the electro-optical device 100z according to a second reference example. FIG. 6 is a graph illustrating a wavelength-transmittance relationship of the electro-optical device 100a or the like according to the first configuration example of the invention. Meanwhile, in FIG. 6, the wavelength-transmittance relationship of the electro-optical device 100a according to the first configuration of the invention is expressed by a solid line L1a, the characteristic of the wavelength-transmittance relationship of the electro-optical device 100y according to the first reference example is expressed by a long broken line L1y, and the characteristic of the wavelength-transmittance relationship of the electro-optical device 100z according to the second reference example is expressed by a short broken line Liz.

As illustrated in FIG. 5, in the electro-optical device 100a according to the first configuration example of the electro-optical device to which the invention is applied, the pixel electrode 9a includes a first electrically conducting layer 9e1 which includes the ITO film stacked the first light-transmitting dielectric layer 9f. In the embodiment, in the pixel electrode 9a, one-stacked first electrically conducting layer 9e1, which includes the ITO film, is stacked two-stacked first dielectric layer 9f (first dielectric layers 9f1 and 9f2).

In addition, the common electrode 21 includes the second electrically conducting layer 21e1 which includes the ITO film stacked the second light-transmitting dielectric layer 21f. In the embodiment, in the common electrode 21, one-stacked second electrically conducting layer 21e1, which includes the ITO film, is stacked two-stacked second dielectric layer 21f (second dielectric layers 21f1 and 21f2)

Accordingly, in the electro-optical device 100a according to the first configuration example, generally, the anti-reflection layer 280, the dust-proof glass 28, the light-transmitting substrate 29 (second substrate 20), the second dielectric layer 21f1, the second electrically conducting layer 21e1, the second dielectric layer 21f2, the second oriented film 26, the electro-optical layer 50, the first oriented film 16, the first dielectric layer 9f2, the first electrically conducting layer 9e1, the first dielectric layer 9f1, the light-transmitting substrate 19 (first substrate 10), the dust-proof glass 18, and the anti-reflection layer 180 are sequentially stacked along light travel direction which is expressed by an arrow L.

In the pixel electrode 9a of the electro-optical device 100a according to the first configuration example of the embodiment, the first dielectric layer 9f1 on the lower layer side includes an aluminum oxide film (refractive index=1.77) which has a thickness of 100 nm, and the first dielectric layer 9f2 on the upper layer side includes an aluminum oxide film which has a thickness of 90 nm. The first electrically conducting layer 9e1 of the pixel electrode 9a includes the ITO film (refractive index=1.95) which has a thickness of 90 nm. In the common electrode 21, the second dielectric layer 21f1 on the lower layer side includes an aluminum oxide film which has a thickness of 100 nm, and the second dielectric layer 21f2 on the upper layer side includes an aluminum oxide film which has a thickness of 90 nm. The second electrically conducting layer 21e1 of the common electrode 21 includes an ITO film which has a thickness of 90 nm.

In contrast, in the electro-optical device 100y according to the reference example 1, the first dielectric layer 9f is not formed in the pixel electrode 9a, and includes only the ITO film which has a thickness of 90 nm. In addition, the second dielectric layer 21f is not formed in the common electrode 21, and includes only the ITO film which has a thickness of 90 nm.

In the electro-optical device 100z according to the second reference example, the first dielectric layer 9f is not formed in the pixel electrode 9a and includes only the ITO film which has a thickness of 90 nm. In addition, similar to the electro-optical device 100a to which the invention is applied, the common electrode 21 includes the second electrically conducting layer 21e1 which includes the ITP film stacked the second light-transmitting dielectric layer 21f.

In a case in which the wavelength dispersion characteristics of the electro-optical devices 100a, 100y, and 100z configured as above are evaluated, the wavelength-transmittance relationship of the layer configuration illustrated in FIG. 5 is measured. The results are illustrated in FIG. 6. As being understood from FIG. 6, in the electro-optical device 100a according to the first configuration of the invention, both the pixel electrode 9a and the common electrode 21 have a structure in which the electrically conducting layer and the light-transmitting dielectric layer are laminated. Therefore, the wavelength dispersion is small in either of the pixel electrode 9a or the common electrode 21. Therefore, in the electro-optical device 100a according to the first configuration of the invention, in a case in which the electro-optical devices 100y and 100z according to the first and second reference examples are compared, high transmittance is expressed in a wavelength region including wavelengths of 400 nm to 700 nm and the change in transmittance due to the wavelength is small. Therefore, according to the invention, it is possible to improve brightness and color reproducibility.

Figure 7:
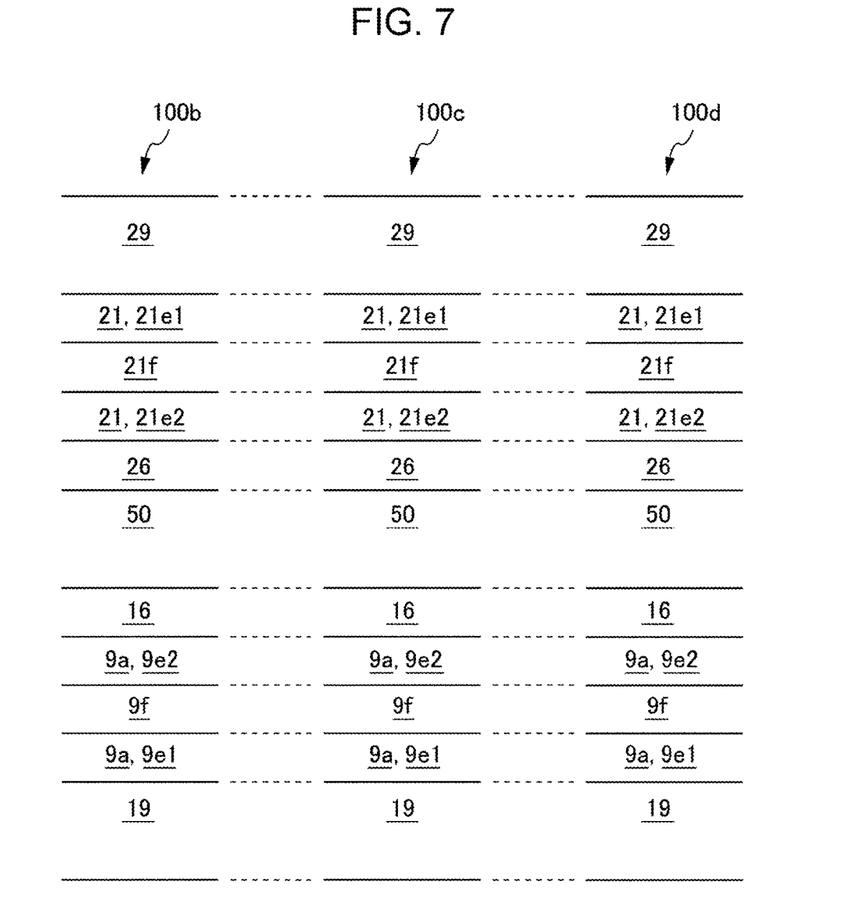
FIG. 7 is an explanatory view illustrating the configurations of pixel electrodes and common electrodes of the electro-optical devices according to a second configuration example, a third configuration example, and a fourth configuration example of the invention.
Figure 8:
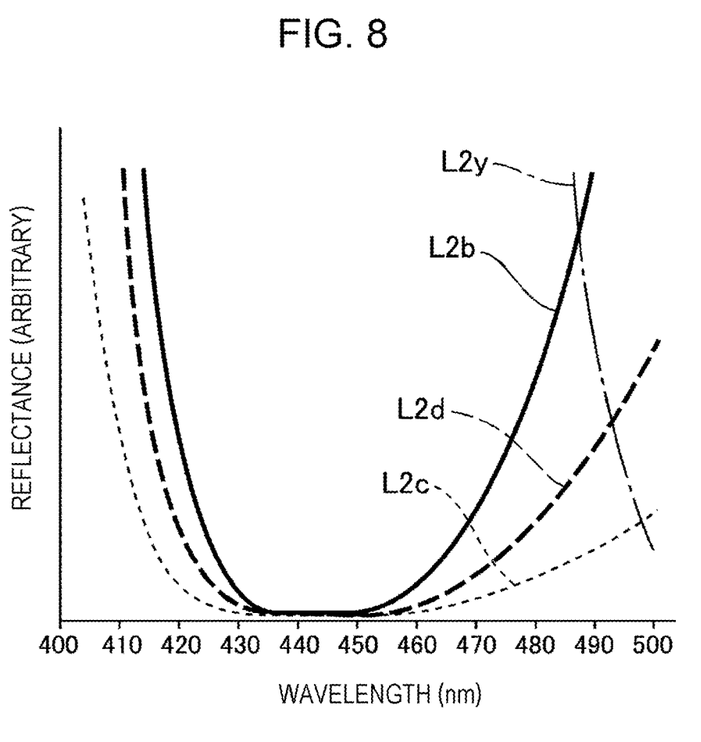
FIG. 8 is a graph illustrating a wavelength-reflectance relationship of the electro-optical device or the like to which the invention is applied.

Second Configuration Example, Third Configuration Example, and Fourth Configuration Example FIG. 7 is an explanatory view illustrating the configurations of the pixel electrodes 9a and the common electrodes 21 of electro-optical devices 100b and 100c, and 100d according to the second configuration example, the third configuration example, and the fourth configuration example of the invention. FIG. 8 is a graph illustrating a wavelength-reflectance relationship of the electro-optical devices 100 to which the invention is applied. In FIG. 8, the wavelength-reflectance relationship of the electro-optical device 100b according to the second configuration example of the invention is expressed by a solid line L2b, the wavelength-reflectance relationship of the electro-optical device 100c according to the third configuration example of the invention is expressed by a short broken line L2c, and the wavelength-reflectance relationship of the electro-optical device 100d according to the fourth configuration example of the invention is expressed by a long broken line Ltd. In addition, the wavelength-reflectance relationship of the electro-optical device 100y according to the first reference example illustrated in FIG. 5 is expressed by a dashed line L2y.

As illustrated in FIG. 7, in the electro-optical devices 100b, 100c, and 100d according to the second configuration example, the third configuration example, and the fourth configuration example of the invention, the pixel electrodes 9a include the first electrically conducting layers 9e1 which include the ITO films stacked the first light-transmitting dielectric layers 9f. In the example, the pixel electrodes 9a further include third electrically conducting layers 9e2 which include the ITO films, and the first dielectric layers 9f are provided between the first electrically conducting layers 9e1 and the third electrically conducting layers 9e2. In addition, the common electrodes 21 include the second electrically conducting layers 21e1 which include the ITO films stacked the second light-transmitting dielectric layers 21f. In the example, the common electrodes 21 further include fourth electrically conducting layers 21e2 which include the ITO films, and the second dielectric layers 21f are provided between the second electrically conducting layers 21e1 and the fourth electrically conducting layers 21e2. Accordingly, in any of the configuration examples illustrated in FIG. 7, the first electrically conducting layer 9e1, the first dielectric layer 9f, and the third electrically conducting layer 9e2, that is, three layers are sequentially stacked the pixel electrodes 9a. In addition, in the common electrode 21, the second electrically conducting layer 21e1, the second dielectric layer 21f, and the fourth electrically conducting layer 21e2, that is, three layers are sequentially laminated. Meanwhile, the first oriented film 16 and the second oriented film 26 have a thickness of 70 nm.

In the electro-optical devices 100b and 100c according to the second configuration example and the third configuration example of the invention, the dielectric layers and electrically conducting layers are formed of the same material in the pixel electrodes 9a and the common electrode 21.

More specifically, in the pixel electrode 9a of the electro-optical device 100b according to the second configuration example of the invention, the first dielectric layer 9f includes an aluminum oxide film which has a thickness of 53 nm. In addition, in the pixel electrode 9a, the first electrically conducting layer 9e1 on the lower layer side includes the ITO film which has a thickness of 20 nm, and the third electrically conducting layer 9e2 on the upper layer side includes the ITO film which has a thickness of 20 nm. In the common electrode 21, the second dielectric layer 21f includes an aluminum oxide film which has a thickness of 42 nm. In the common electrode 21, the second electrically conducting layer 21e1 on the lower layer side includes the ITO film which has a thickness of 38 nm, and the fourth electrically conducting layer 21e2 on the upper layer side includes the ITO film which has a thickness of 20 nm.

In the pixel electrode 9a of the electro-optical device 100c according to the third configuration example of the invention, the first dielectric layer 9f includes the silicon oxide film (refractive index=1.46) which has a thickness of 53 nm. In addition, in the pixel electrode 9a, the first electrically conducting layer 9e1 on the lower layer side includes the ITO film which has a thickness of 20 nm, and the third electrically conducting layer 9e2 on the upper layer side includes the ITO film which has a thickness of 20 nm. In the common electrode 21, the second dielectric layer 21f includes the silicon oxide film which has a thickness of 42 nm. In the common electrode 21, the second electrically conducting layer 21e1 on the lower layer side includes the silicon oxide film which has a thickness of 38 nm, and the fourth electrically conducting layer 21e2 on the upper layer side includes the ITO film which has a thickness of 20 nm.

In contrast, in the electro-optical device 100d according to the fourth configuration example of the invention, the electrically conducting layer is formed of the same material in the pixel electrode 9a and the common electrode 21 but the dielectric layer is formed of different materials in the pixel electrode 9a and the common electrode 21. That is, the first dielectric layer 9f includes a material which is different from the second dielectric layer 21f. In addition, the first dielectric layer 9f includes the silicon oxide film, and the second dielectric layer 21f includes the aluminum oxide film.

More specifically, in the pixel electrode 9a of the electro-optical device 100d according to the fourth configuration example of the invention, the first dielectric layer 9f includes a silicon oxide film which has a thickness of 53 nm. In addition, in the pixel electrode 9a, the first electrically conducting layer 9e1 on the lower layer side includes an ITO film which has a thickness of 20 nm, and the third electrically conducting layer 9e2 on the upper layer side includes an ITO film which has a thickness of 20 nm. In the common electrode 21, the second dielectric layer 21f includes an aluminum oxide film which has a thickness of 42 nm. In the common electrode 21, the second electrically conducting layer 21e1 on the lower layer side includes an ITO film which has a thickness of 38 nm, and the fourth electrically conducting layer 21e2 on the upper layer side includes an ITO film which has a thickness of 20 nm.

In a case in which the wavelength dispersion characteristics of the electro-optical devices 100b, 100c, and 100d, which are configured as described above, are evaluated, the wavelength-reflectance relationship of the layer configurations illustrated in FIG. 7 is simulated. The results are illustrated in FIG. 8. As being understood from FIG. 8, in the electro-optical devices 100b, 100c, and 100d to which the invention is applied, both the pixel electrodes 9a and the common electrodes 21 form structures in which the electrically conducting layers and the light-transmitting dielectric layers are laminated. Therefore, in any of the pixel electrodes 9a and the common electrodes 21, the wavelength dispersion is small. Therefore, in the electro-optical devices 100b, 100c, and 100d to which the invention is applied, reflectance is low in a wavelength region including wavelengths of 430 nm to 460 nm, compared to the electro-optical device 100y according to the first reference example.

In addition, in a case in which comparison is performed on the reflectance in the wavelength region, including wavelengths of 430 nm to 460 nm, of the electro-optical devices 100b, 100c, and 100d to which the invention is applied, the electro-optical device 100c according to the third configuration example, in which both the first dielectric layer 9f and the second dielectric layer 21f are formed of the silicon oxide film, has lower reflectance than the electro-optical device 100b according to the second configuration example, in which both the first dielectric layer 9f and the second dielectric layer 21f are formed of the aluminum oxide film. In addition, the electro-optical device 100d according to the fourth configuration example, in which the first dielectric layer 9f is formed of the silicon oxide film and the second dielectric layer 21f is formed of the aluminum oxide film, has lower reflectance in the wavelength region including the wavelengths of 430 nm to 460 nm than the electro-optical device 100b according to the second configuration example, and has higher reflectance in the electro-optical device 100c according to the third configuration example. Accordingly, the electro-optical device 100c according to the third configuration example, in which both the first dielectric layer 9f and the second dielectric layer 21f are formed of the silicon oxide film, has the lowest reflectance.

Advantage of Electro-Optical Device 100d According to Fourth Configuration Example The electro-optical device 100d according to the fourth configuration example has relatively low reflectance, and the dielectric layers are formed of different materials in the pixel electrode 9a and the common electrode 21. Therefore, as will be described below, it is possible to appropriately form the first dielectric layer 9f and the second dielectric layer 21f in the first substrate 10 and the second substrate 20, respectively.

For example, if film formation temperature is low in a case in which the first dielectric layer 9f and the second dielectric layer 21f are formed by the silicon oxide film, unevenness is generated on the surface, and thus there is a problem in that optical characteristics are low, or the like. For example, in a case in which a film is formed using a HDP-CVD method under the condition in which silane gas and oxygen gas are used as source gas and temperature is 200° C., unevenness is generated on the surface. In addition, even in a case in which a film is formed using a PE-CVD method under the condition in which silane gas and nitrous oxide gas are used as source gas and temperature is 200° C., unevenness is generated on the surface. In contrast, if film formation temperature is high, it is difficult that unevenness is generated on the surface. For example, in a case in which a film is formed using the HDP-CVD method under the condition in which TEOS is used as source gas and temperature is 400° C., it is difficult that unevenness is generated on the surface. Meanwhile, in a case in which a film is formed using the HDP-CVD method under the condition in which TEOS is used as source gas and temperature is 300° C. or lower, the film formation speed is too high, and thus it is difficult to control the film thickness. Accordingly, the first dielectric layer 9f and the second dielectric layer 21f are formed by the silicon oxide film, the film formation temperature may be 400° C. or higher.

Therefore, in the electro-optical device 100d according to the fourth configuration example, the first dielectric layer 9f, which is stacked the pixel electrode 9a in the first substrate 10, is formed of a silicon oxide film.

However, if the film formation temperature is 400° C. or higher in a case in which the second dielectric layer 21f stacked the common electrode 21 in the second substrate 20 is formed of the silicon oxide film, cracks are easily generated on the lens layer 240 for forming the lens 24. In addition, there is a case in which lens layer 240 is exfoliated due to the cracks. That is, the lens layer 240 is formed to fill the recess section due to the lens surfaces 291 and then the surface 241 is flattened, and thus the film thickness of the lens layer 240 changes greatly depending on the location. In such a state, if the silicon oxide film is formed at a film formation temperature of 400° C. or higher, large stress is generated in the lens layer 240 due to heat at that time, and thus it is easy that cracks are generated. However, in the electro-optical device 100d according to the fourth configuration example, the second dielectric layer 21f is formed of the aluminum oxide film. Even in a case in which the aluminum oxide film is formed at relatively low temperature, it is difficult that unevenness is generated on the surface. Accordingly, even in a case in which the second dielectric layer 21f is formed on the second substrate 20, it is difficult that cracks are generated on the lens layer 240. Therefore, in the electro-optical device 100d according to the fourth configuration example, it is possible to appropriately provide the first dielectric layer 9f and the second dielectric layer 21f on the first substrate 10 and the second substrate 20, respectively.

Meanwhile, in the electro-optical device 100d according to the fourth configuration example of the invention, the second dielectric layer 21f is formed of the aluminum oxide film in order to form the lens surfaces 291, which include the concave surface, on the second substrate 20. However, in a case in which the lens surfaces 291, which include the convex surface, are formed on the second substrate 20, the lens layer 240 is formed, and thus it is preferable that the second dielectric layer 21f is formed of the aluminum oxide film.

In addition, in the electro-optical device 100d according to the fourth configuration example of the invention, the lens (condensing element) is formed on the second substrate 20 using the lens layer 240, and thus the second dielectric layer 21f is formed of the aluminum oxide film. However, even in a case in which a prism-shaped condensing element is formed on the second substrate 20 instead of the lens 24, a layer in which the film thickness changes greatly depending on the location is formed. Therefore, even in the case, it is preferable that the second dielectric layer 21f is formed of the aluminum oxide film from the viewpoint of avoiding the generation of the cracks. In addition, in the embodiment, the combination of the aluminum oxide film and the silicon oxide film is exemplified in a case in which the dielectric layers are formed of different materials. However, films other than the aluminum oxide film and the silicon oxide film, that is, a magnesium fluoride film, or the like may be used.

Modified Example of Embodiment

In the above-described embodiment, in each of the pixel electrode 9a and the common electrode 21, the dielectric layers and the electrically conducting layers are formed by totally three layers, each of the pixel electrode 9a and the common electrode 21 may be formed as an electrode in which a plurality of dielectric layers and a plurality of conductive layers are alternately laminated. In addition, each of the pixel electrode 9a and the common electrode 21 may be formed by a two-stacked structure including the dielectric layer and the electrically conducting layer.

In addition, in a case in which two or more electrically conducting layers are formed in each of the pixel electrode 9a and the common electrode 21, the electrically conducting layers are electrically conducted to each other. In this case, it is preferable that the electrically conducting layers are formed to project out from the dielectric layer, which project from the dielectric layer, come into contact with each other.

Mounting Example on Electronic Apparatus

Figure 9:
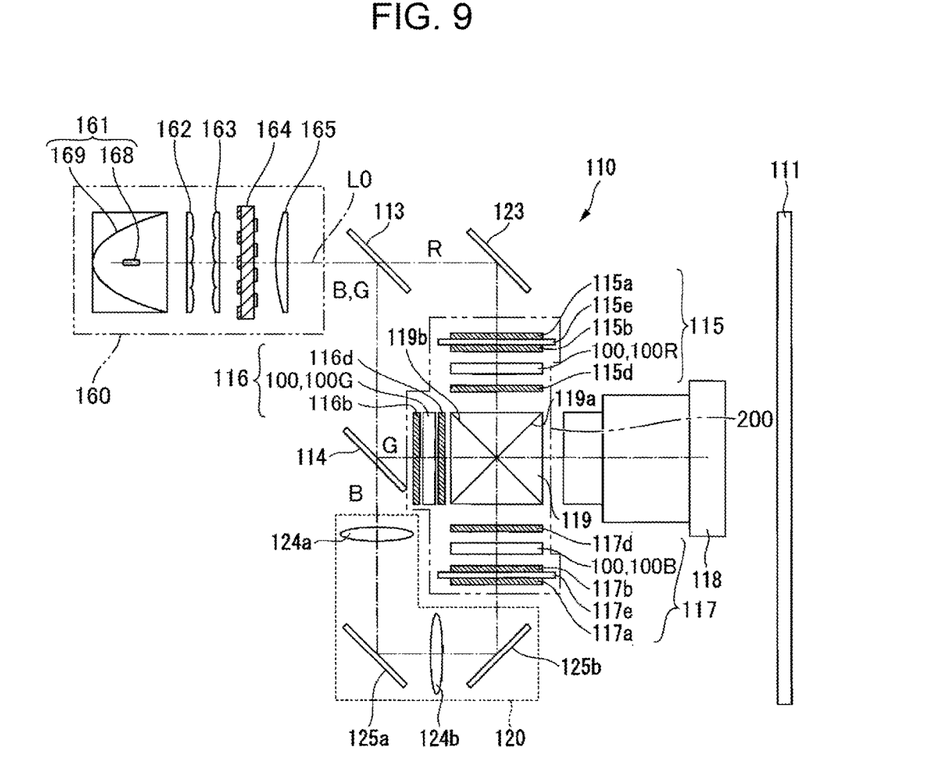
FIG. 9 is a schematic configuration diagram illustrating a transmission-type liquid crystal apparatus (electronic apparatus) using the electro-optical device to which the invention is applied.

FIG. 9 is a schematic configuration diagram illustrating a transmission-type liquid crystal apparatus (electronic apparatus) using the electro-optical device 100 to which the invention is applied. Meanwhile, in the description below, a plurality of electro-optical devices 100, to which light having different wavelength regions is supplied, are used. However, the electro-optical device 100 to which the invention is applied is used for all of the electro-optical devices 100.

The transmission-type liquid crystal apparatus 110 illustrated in FIG. 9 is a liquid crystal projector using the transmission-type electro-optical device 100, and displays an image by irradiating light to a projection member 111 which includes a screen or the like. The transmission-type liquid crystal apparatus 110 includes, along an optical axis L0 of the apparatus, a lighting device 160, a plurality of electro-optical devices 100 (liquid crystal light valves 115 to 117) to which light emitted from the lighting device 160 is supplied, a cross dichroic prism 119 (photosynthetic optical system) which synthesizes and emits light that is emitted from the plurality of electro-optical devices 100, and a projection optical system 118 which projects light synthesized by the cross dichroic prism 119. In addition, the transmission-type liquid crystal apparatus 110 includes dichroic mirrors 113 and 114, and a relay system 120. In the transmission-type liquid crystal apparatus 110, the electro-optical device 100 and the cross dichroic prism 119 form an optical unit 200.

In the lighting device 160, along the optical axis L0 of the apparatus, a light source section 161, a first integrator lens 162, which includes a lens array such as a fly-eye lens, a second integrator lens 163, which includes a lens array such as a fly-eye lens, a polarized light conversion element 164, and a condenser lens 165 are sequentially arranged. The light source section 161 includes a light source 168 which emits white light including red light R, green light G and blue light B, and a reflector 169. The light source 168 is formed of an extra-high pressure mercury lamp or the like, and the reflector 169 includes a parabolic cross section. The first integrator lens 162 and the second integrator lens 163 equalize the luminance distribution of light emitted from the light source section 161. The polarized light conversion element 164 causes light emitted from the light source section 161 to be polarized light which has a specific vibration direction similar to, for example, s-polarized light.

A dichroic mirror 113 causes red light R, which is included in light emitted from the lighting device 160, to pass therethrough, and reflects green light G and blue light B. A dichroic mirror 114 causes blue light B of green light G and blue light B, which are reflected in the dichroic mirror 113, to pass therethrough, and reflects green light G. As above, the dichroic mirrors 113 and 114 form a color separation optical system which separates light emitted from the lighting device 160 into red light R, green light G, and blue light B.

A liquid crystal light valve 115 is a transmission-type liquid crystal apparatus that modulates red light R, which passes through the dichroic mirror 113 and is reflected in a reflection mirror 123, according to an image signal. The liquid crystal light valve 115 includes a $\lambda/2$ phase difference plate 115a, a first polarizing plate 115b, an electro-optical device 100 (red electro-optical device 100R), and a second polarizing plate 115d. Here, even in a case in which red light R, which is incident into the liquid crystal light valve 115, passes through the dichroic mirror 113, polarized light is not changed, and thus s-polarized light is not changed.

The λ/2 phase difference plate 115a is an optical element that converts s-polarized light which is incident into the liquid crystal light valve 115 into p-polarized light. The first polarizing plate 115b is a polarizing plate that cuts off s-polarized light and causes p-polarized light to pass therethrough. The electro-optical device 100 (red electro-optical device 100R) is formed to convert p-polarized light into s-polarized light (in a case of halftone, circularly polarized light or elliptically polarized light) through modulation according to the image signal. The second polarizing plate 115d is a polarizing plate that cuts off p-polarized light and causes s-polarized light to pass therethrough. Accordingly, the liquid crystal light valve 115 modulates red light R according to the image signal, and emits modulated red light R toward the cross dichroic prism 119. The λ/2 phase difference plate 115a and the first polarizing plate 115b are arranged in a state in which the λ/2 phase difference plate 115a and the first polarizing plate 115b come into contact with a light-transmitting glass plate 115e which does not convert polarized light, and it is possible to prevent distortion of the λ/2 phase difference plate 115a and the first polarizing plate 115b due to the generation of heat.

A liquid crystal light valve 116 is a transmission-type liquid crystal apparatus that modulates green light G, which is reflected in the dichroic mirror 114 after being reflected in the dichroic mirror 113, according to the image signal. The liquid crystal light valve 116 includes a first polarizing plate 116b, an electro-optical device 100 (green electro-optical device 100G), and a second polarizing plate 116d, similar to the liquid crystal light valve 115. Green light G, which is incident into the liquid crystal light valve 116, is s-polarized light which is reflected in and incident into the dichroic mirrors 113 and 114. The first polarizing plate 116b is a polarizing plate that cuts off p-polarized light and causes s-polarized light to pass therethrough. The electro-optical device 100 (green electro-optical device 100G) is formed to convert s-polarized light into p-polarized light (in a case of halftone, circularly polarized light or elliptically polarized light) through modulation according to the image signal. The second polarizing plate 116d is a polarizing plate that cuts off s-polarized light and causes p-polarized light to pass therethrough. Accordingly, the liquid crystal light valve 116 modulates green light G according to the image signal, and emits modulated green light G toward the cross dichroic prism 119.

The liquid crystal light valve 117 is a transmission-type liquid crystal apparatus that modulates blue light B, which is reflected in the dichroic mirror 113 and passes through the relay system 120 after passing through the dichroic mirror 114, according to the image signal. The liquid crystal light valve 117 includes a λ/2 phase difference plate 117a, a first polarizing plate 117b, an electro-optical device 100 (blue electro-optical device 100B), and a second polarizing plate 117d, similar to the liquid crystal light valves 115 and 116. Blue light B, which is incident into the liquid crystal light valve 117, is reflected in the two reflection mirrors 125a and 125b of the relay system 120 after being reflected in the dichroic mirror 113 and passing through the dichroic mirror 114, and thus blue light B becomes s-polarized light.

The λ/2 phase difference plate 117a is an optical element that converts s-polarized light, which is incident into the liquid crystal light valve 117, into p-polarized light. The first polarizing plate 117b is a polarizing plate that cuts off s-polarized light and causes p-polarized light to pass therethrough. The electro-optical device 100 (blue electro-optical device 100B) is formed to convert p-polarized light into s-polarized light (in a case of halftone, circularly polarized light or elliptically polarized light) through modulation according to the image signal. The second polarizing plate 117d is a polarizing plate that cuts off p-polarized light and causes s-polarized light to pass therethrough. Accordingly, the liquid crystal light valve 117 modulates blue light B according to the image signal, and emits modulated blue light B toward the cross dichroic prism 119. Meanwhile, the λ/2 phase difference plate 117a and the first polarizing plate 117b are arranged in a state in which the λ/2 phase difference plate 117a and the first polarizing plate 117b come into contact with a glass plate 117e.

The relay system 120 includes relay lenses 124a and 124b and reflection mirrors 125a and 125b. The relay lenses 124a and 124b are provided to prevent optical loss due to long optical path of blue light B. The relay lens 124a is arranged between the dichroic mirror 114 and the reflection mirror 125a. The relay lens 124b is arranged between the reflection mirrors 125a and 125b. The reflection mirror 125a reflects blue light B, which passes through the dichroic mirror 114 and is emitted from the relay lens 124a, toward the relay lens 124b. The reflection mirror 125b reflects blue light B, which is emitted from the relay lens 124b, toward the liquid crystal light valve 117.

The cross dichroic prism 119 is a color synthesis optical system in which two dichroic films 119a and 119b are perpendicularly arranged in an X-shape. The dichroic film 119a is a film which reflects blue light B and causes green light G to pass therethrough, and the dichroic film 119b is a film which reflects red light R and causes green light G to pass therethrough. Accordingly, the cross dichroic prism 119 synthesizes red light R, green light G, and blue light B which are modulated in respective liquid crystal light valves 115 to 117, and emits synthesized light toward the projection optical system 118.

Meanwhile, light which is incident into the cross dichroic prism 119 from the liquid crystal light valves 115 and 117 is s-polarized light, and light which is incident into the cross dichroic prism 119 from the liquid crystal light valve 116 is p-polarized light. As above, in a case in which light which is incident into the cross dichroic prism 119 is converted into different types of polarized light, it is possible to synthesize light which is incident from each of the liquid crystal light valves 115 to 117 in the cross dichroic prism 119. Here, generally, the dichroic films 119a and 119b are excellent in reflectance properties of s-polarized light. Therefore, it is assumed that red light R and blue light B which are reflected in the dichroic films 119a and 119b are s-polarized light and green light G which passes through the dichroic films 119a and 119b is p-polarized light. The projection optical system 118 includes projection lenses (not shown in the drawing), and projects light which is synthesized in the cross dichroic prism 119 on to a projection member 111 such as the screen.

Other Transmission-Type Liquid Crystal Apparatuses

In the transmission-type liquid crystal apparatus, an LED light source, which emits light of the respective colors, or the like may be used as the light source section, and respective colors which are emitted from the LED light source may be supplied to separated liquid crystal apparatuses.

The electro-optical device 100 to which the invention is applied may be used for a projection-type Head-Up Display (HUD) or a direct viewing type Head Mounted Display (HMD), a mobile phone, a Personal Digital Assistants (PDA), a digital camera, a liquid crystal television, a car navigation apparatus, a video phone and the like, in addition to the electronic apparatus.

The entire disclosure of Japanese Patent Application No. 2015-186470, Sep. 24, 2015 is expressly incorporated by reference herein.

What is claimed is:

1. An electro-optical device comprising:
a first light-transmitting substrate;
a second light-transmitting substrate that faces the first substrate;
an electro-optical layer that is provided between the first substrate and the second substrate;
a light-transmitting pixel electrode that is provided between the first substrate and the electro-optical layer; and
a light-transmitting common electrode that is provided between the second substrate and the electro-optical layer,
wherein
the pixel electrode includes a first dielectric layer, a first electrically conducting layer, and a second electrically conducting layer,
the common electrode includes a second dielectric layer, a third electrically conducting layer, and a fourth electrically conducting layer,
the first dielectric layer is provided between the first electrically conducting layer and the second electrically conducting layer, and
the second dielectric layer is provided between the third electrically conducting layer and the fourth electrically conducting layer.

2. The electro-optical device according to claim 1, wherein the first dielectric layer includes a material which is different from that of the second dielectric layer.

3. The electro-optical device according to claim 2, wherein the first dielectric layer includes a silicon oxide film, and
wherein the second dielectric layer includes an aluminum oxide film.

4. The electro-optical device according to claim 2, further comprising:
a lens layer provided between the second substrate and the common electrode,
wherein the second substrate includes a lens surface which includes a concave surface or a convex surface in a location overlapping the pixel electrode on a surface of a side of the first substrate in plan view, and
wherein the lens layer covers the lens surface, and includes a flat surface on a side opposite to the second substrate.

5. An electronic apparatus includes the electro-optical device according to claim 1.

6. An electronic apparatus includes the electro-optical device according to claim 2.

7. An electronic apparatus includes the electro-optical device according to claim 3.

8. An electronic apparatus includes the electro-optical device according to claim 4.

9. An electro-optical device comprising:
a first light-transmitting substrate;
a second light-transmitting substrate that faces the first substrate;
an electro-optical layer that is provided between the first substrate and the second substrate;
a light-transmitting pixel electrode that is provided between the first substrate and the electro-optical layer; and
a light-transmitting common electrode that is provided between the second substrate and the electro-optical layer,
wherein the pixel electrode is an electrode in which a plurality of dielectric layers and a plurality of conductive layers are alternately stacked, and
wherein the common electrode is an electrode in which the plurality of dielectric layers and the plurality of conductive layers are alternately stacked.

10. An electronic apparatus includes the electro-optical device according to claim 9.

* * * * *